UNITED STATES PATENT OFFICE 1,975,436

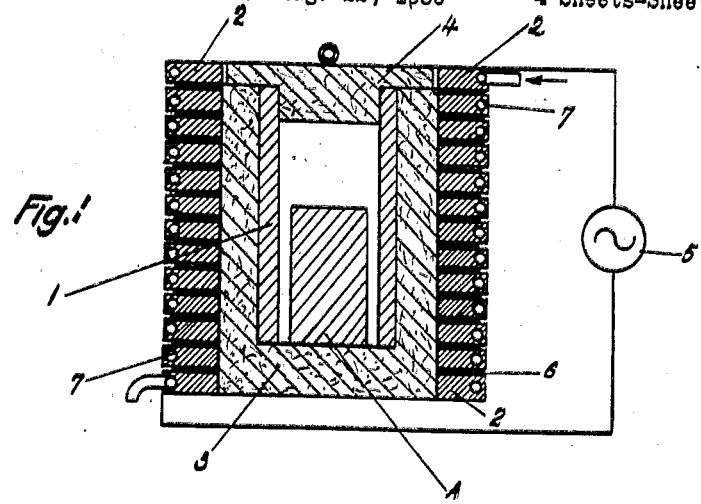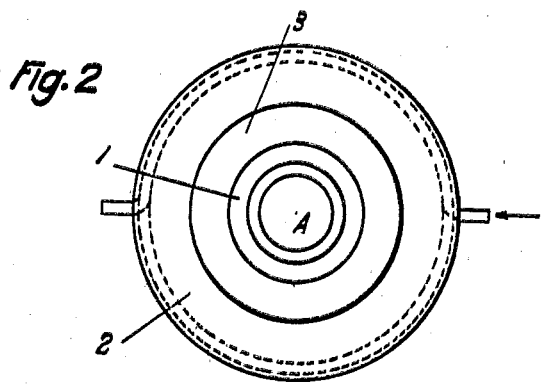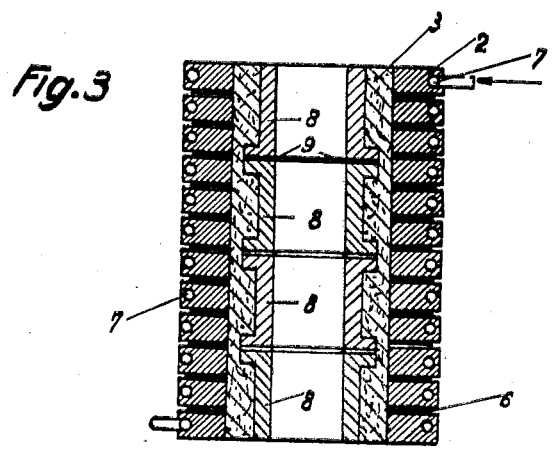

METHOD OF HEATING BY INDUCTION AND FURNACE THEREFOR

Victor Sorrel and Louis André Lafont, Grenoble, France, assignors to Ugine-Infra, Grenoble, France, a corporation of France Application August 22, 1930, Serial No. 477,172
In France November 8, 1929

6 Claims. (Cl. 219—13)

The subject of the present invention is a method of heating by induction, by means of which it is possible automatically to regulate the temperature of the articles to be heated or of the muffle of a furnace containing such articles.

The method of heating by induction consists essentially in disposing the articles or the metallic muffle to be heated in an alternating magnetic field which generates in the articles or the muffle induced currents which raise the temperature.

These induced currents are the stronger the greater is the magnetic permeability of the metal of which the article or muffle is made. In addition, a considerable quantity of heat is developed in the article or the muffle by hysteresis cycles, especially if the material of which it is made has a high hysteretic coefficient.

The use in induction furnaces of a muffle of magnetic metal is of particular interest; muffles of this nature have the advantage over muffles of non-magnetic metal, other things being equal, of absorbing a greater quantity of calorific energy, due firstly to their high induction, and secondly to their hysteresis.

Hitherto these properties of high efficiency of muffles of magnetic metal and comparatively low efficiency of muffles of non-magnetic metal have not been used to obtain in practice an automatic regulation of the furnace temperature.

According to the present invention a muffle or article is heated by induction and its temperature is controlled by using for the muffle or article a metal or alloy which loses its magnetic properties at or about the temperature desired. Usually the inducing winding is fed at such a voltage and frequency that the heat produced by electromagnetic induction in the muffle or article in the magnetic state is greater and in the non-magnetic state is not greater than the heat lost therefrom at the desired temperature.

The operation is then as follows:—

Under the influence of the inducing field the temperature of the muffle or article increases rapidly because of the eddy currents developed therein and of hysteresis, and this the more rapidly as the material of the article or muffle has a higher permeability and hysteretic coefficient.

When the material has reached the temperature of disappearance of its ferro-magnetism it gradually loses its magnetic properties; the permeability and hysteresis decrease, consequently the quantity of heat generated diminishes. At a certain instant this quantity of heat is equal to the heat losses of the article or muffle and from this moment the temperature remains constant and there is no further loss of ferro-magnetism in the material.

If for any reason the heat losses increase the temperature tends to decrease. Owing to this cause a part of the ferro-magnetism of the material reappears, the calorific energy which it receives increases and equilibrium between the heat lost and the heat generated by induction is automatically re-established. The reverse takes place if the heat losses diminish.

The article or muffle thus maintains itself automatically at the temperature of disappearance of ferro-magnetism of its material, as is borne out by experience.

The selection of material is of course dependent on the desired temperature, but among such materials may be mentioned iron, cobalt, nickel and their alloys.

It is also possible using the constant temperature thus obtained as a starting point, to make the temperature increase or decrease in a predetermined manner by suitably varying the frequency or voltage supplied to the primary winding beyond the limits corresponding to automatic regulations; the constant temperature first obtained by automatic regulation then serves as an invariable reference standard from which the temperature cycle at each operation starts.

A difficulty arises when it is desired to lower the temperature in this manner. The return of the metal to the ferro-magnetic state would make the regulation of the inducing current extremely difficult. In such cases the difficulty is obviated by using metals in which the return to ferro-magnetism on recooling takes place only at a temperature lower than that of loss of ferromagnetism on heating. It is possible in this way to carry out the decrease of temperature without difficulty down to the temperature of return of ferro-magnetism.

The surface oxidation of the material may, if required, be counteracted without difficulty by covering its surface with a deposit of metal which does not oxidize at the temperatures of use such for example as cobalt, chromium or nickel, or other suitable protective coatings may be used, provided they are such as to retain the effectiveness of the temperatures in question.

If required, pole pieces of laminated sheet metal may be used for completing the magnetic circuit in which the muffle or article is placed, and for thus strengthening the field.

An induction furnace set up according to the invention is particularly suitable for various thermal treatments of metals or alloys such as hardening, reheating, tempering, and the like for fusing such metals or alloys, for heating chemical substances where reactions must take place at a constant temperature, for simple or fractional distillation, fusion, boiling, evaporation or volatilization of various substances.

What has been stated above applies to constant temperature heating of the muffle of a furnace containing any kind of material to be heated and it applies equally to the heating to constant temperature of a metallic object which may be placed direct in the alternating inducing field preferably in a non-magnetic muffle. It would be necessary in the latter case that this article should be made of a magnetic metal of which the temperature of disappearance of ferro-magnetism is equal to the constant temperature to which it is desired to heat the article and at which it is desired to maintain it; and it would also be necessary to see that the characteristics of the inducing current and of the article itself are suitable.

In the accompanying drawings:

Fig. 1 is an axial section of the furnace suitable for carrying out the invention;

Fig. 2 is a plan with the cover removed;

Fig. 3 is an axial section of a variation;

Figure 4:
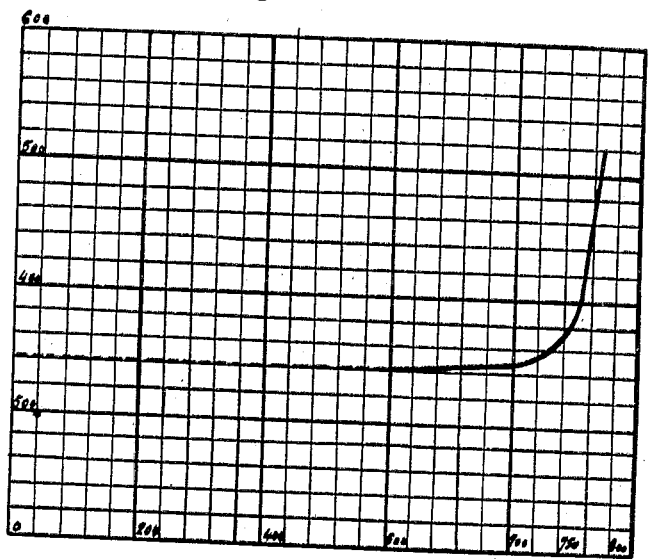
Figs. 4 to 8 are curves of operation of a furnace of stated characteristics.

In Figs. 1 and 2 is shown a muffle 1 of cylindrical form made of ferro-magnetic material preferably with high hysteretic coefficient.

This muffle 1 is placed within a primary winding 2, from which it is separated by a refractory heat-insulating packing 3 of as small a thickness as possible in order to obtain a good power factor. The whole is closed by a refractory lid 4.

The winding 2 formed of strip on edge with mica or like insulation 6 between turns is traversed by an alternating electric current from a source 5. A passage 7 is provided within the section of the conductor for a cooling fluid. The articles or materials to be heated A are placed within the muffle 1.

The operation of the furnace will be illustrated by reference to one particular size. This furnace has a muffle of tungsten steel 200 mm. high, 70 mm. internal diameter and 100 mm. external diameter. The temperature of complete disappearance of ferro-magnetism is for this steel about 765° C.

The thermal insulation of the furnace is such that at a muffle temperature of about 765° C. the heat losses by cooling are 550 watts.

The alternating magnetic field in which the muffle is placed is produced by a primary winding 250 mm. high and 150 mm. diameter formed of turns 10 mm. thick and 35 mm. deep. This winding is fed at 12.8 volts 50 cycles.

Figure 5:
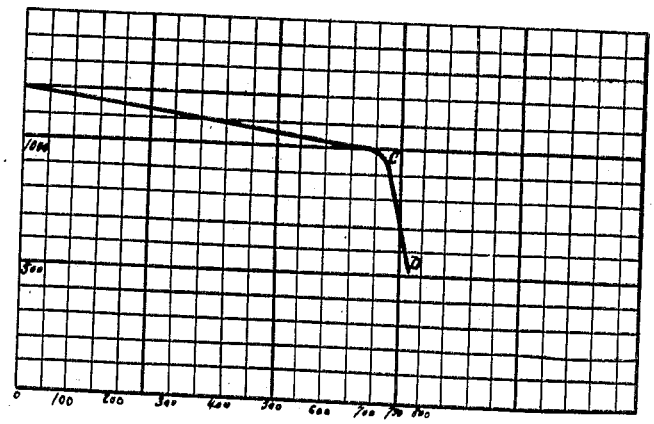
Figure 6:
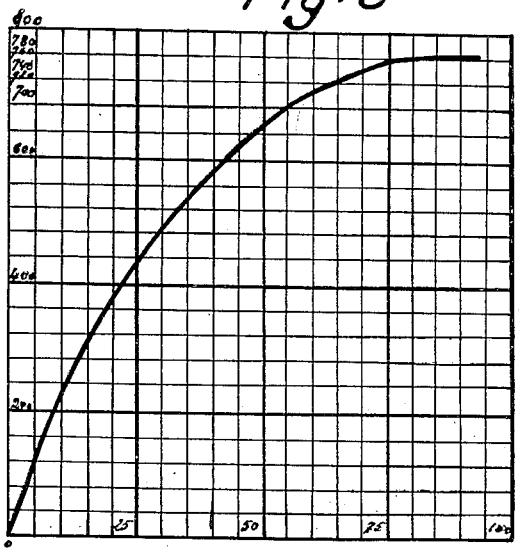

Fig. 4 shows the variation of primary current in terms of temperature, Fig. 5 that of power consumed in terms of temperature, and Fig. 6 the variation of temperature with time in minutes. It will be seen that the current commences at 340 amperes and remains practically constant until the muffle reaches a temperature of about 735° C., which corresponds to the commencement of the magnetic transformation of the material. The power consumed varies at the same time from 1,200 watts to about 960 watts.

From this point the current rises rapidly and the wattage expended in the muffle decreases rapidly until the temperature of the muffle is stabilized at about 760° corresponding to a power consumption of about 550 watts. This point is attained after a heating duration of 90 minutes.

It will be noticed that in consequence of the steep slope of the portion CD of the curve of Fig. 5, a very small variation of temperature corresponds to a large variation of power (a few degrees for 100 watts). If then the conditions of equilibrium vary, say for example the heat losses by cooling diminish or increase due to a change in the heat insulation of the furnace, a new equilibrium will be automatically established above or below 550 watts without the temperature of the muffle varying by more than a few degrees above or below the preceding equilibrium temperature of 760 C., the quantity of heat supplied to the muffle always compensating for the losses.

Figure 7:
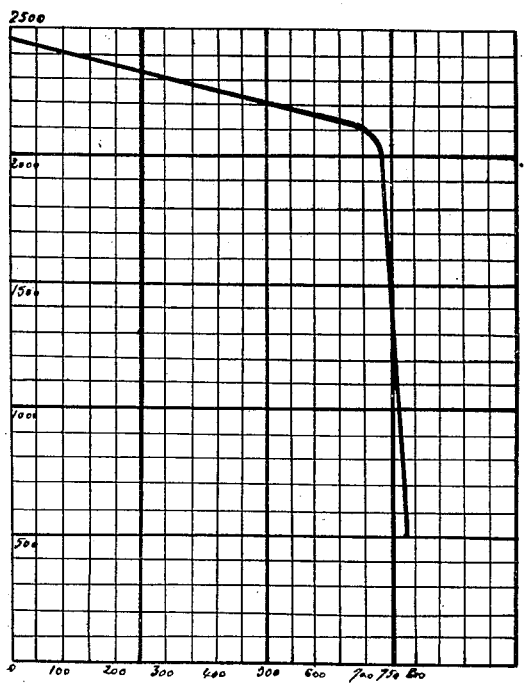
Figure 8:
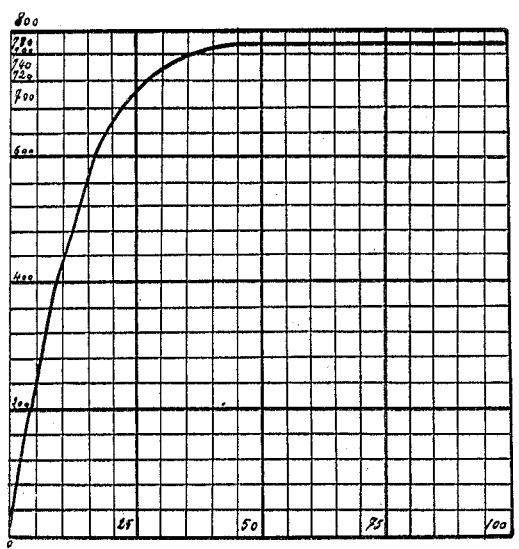

It will also be seen that by using a voltage of 17.5 volts instead of 12.8 volts, the power expended in the muffle at starting will be 2440 watts as shown in Figs. 7 and 8 which correspond to Figs. 5 and 6 and it will finally come down to 550 watts for an equilibrium temperature of 765 to 770° C., that is to say less than 10° higher than in the preceding case; the time taken in this case to reach the equilibrium temperature will not be more than 40 minutes. At this point again, as in the preceding case, automatic regulation will be carried out within narrow temperature limits for large variations of power.

Thus the automatic regulation of temperature is carried out in any given muffle with great precision in spite of considerable variations of voltage and of radiation losses.

Automatic regulation within a still smaller temperature range may be obtained by choosing for the material of the muffle a metal or alloy in which the loss of ferro-magnetism takes place within still narrower temperature limits than those in the case of tungsten steel.

It has been shown how the automatic regulation of temperature is carried out in spite of voltage variations in a muffle of given thickness of a stated composition (tungsten steel) connected in a circuit supplied at constant frequency (50 cycles). It is clear that while maintaining the voltage constant the power converted into heat in the muffle can be caused to vary by modifying either the thickness of the muffle or the frequency of the current, or the resistivity, the permeability or the hysteresis of the metal or alloy of which the muffle is made.

If, still with the furnace having the characteristics indicated above, a voltage higher than 17.5 volts is used, the strength of the current will exceed 850 amperes when the temperature of the muffle has reached 765° C.; the power expended in the muffle which has now become non-magnetic will then be higher than 550 watts. Thus the temperature of the muffle will rise very rapidly up to 765° C., but instead of remaining there in equilibrium will continue to rise beyond it at a much lower rate. It is possible to operate in this way particularly in the case of hardening if the Curie point of the muffle coincides with that of the articles to be hardened which are placed inside it. The heating should be stopped when the temperature of the muffle is raised to the desired amount beyond that corresponding to the disappearance of ferro-magnetism.

Instead of using a frequency of 50 cycles any other frequency may be used.

In the variation of Fig. 3 the muffle is formed of rings 8 of magnetic metals or alloys of different transformation temperatures which are if desired thermally insulated from each other by joints 9; these rings may or may not be of different thickness. The remainder of the apparatus is as previously described. By means of this arrangement each ring of the muffle will have a particular equilibrium temperature equal to that of its point of magnetic transformation, which makes it possible to obtain a predetermined distribution of heating temperatures along the height of the muffle without having to modify the primary winding of the furnace.

Having now particularly described and ascertained the nature of our said invention and in what manner the same is to be performed we declare that what we claim is:—

1. An induction furnace for heating to a series of automatically controlled temperatures graded in reference to location, comprising a muffle built up of different magnetic metals or alloys each of which loses its magnetic properties at the temperature desired at its respective location.

2. An induction furnace for heating to a series of automatically controlled temperatures graded in reference to location, comprising a muffle built up of different magnetic metals or alloys each of which loses its magnetic properties at the temperature desired at its respective location and heat insulating material between the several metals or alloys.

3. An induction furnace for heating to an automatically controlled temperature having a muffle of a magnetic metal or alloy whose magnetic properties disappear at the desired temperature and an inducing winding provided with a passage for cooling fluid.

4. An induction furnace for heating to a series of automatically controlled temperatures graded in reference to location, comprising a muffle built up of different magnetic metals or alloys each of which loses its magnetic properties at the temperature desired at its respective location, heat insulating material between the several metals or alloys, and an inducing winding provided with a passage for cooling fluid.

5. An induction furnace comprising a plurality of annular sections so disposed as to form a muffle, each section being of a magnetic metal or alloy having a magnetic change point different from that of the other section or sections.

6. In the heat-treatment of a ferro-magnetic object by induction, the method which consists in first raising the temperature of such object to approximately its magnetic transformation point by means of heat generated therein by an alternating magnetic field, and then automatically maintaining the temperature of said object approximately constant by feeding to the induction circuit a current of substantially constant voltage and frequency such that the heat produced in said object at its magnetic transformation temperature is somewhat less than its losses by cooling.

VICTOR SORREL.
LOUIS ANDRÉ LAFONT.